United States Patent
Liu et al.

(10) Patent No.: US 9,964,792 B2
(45) Date of Patent: May 8, 2018

(54) LIQUID CRYSTAL DISPLAY

(71) Applicant: Century Technology (Shenzhen) Corporation Limited, Shenzhen (CN)

(72) Inventors: Zhao Liu, Shenzhen (CN); Min Hu, Shenzhen (CN); Chen-Fu Mai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 67 days.

(21) Appl. No.: 14/950,597

(22) Filed: Nov. 24, 2015

(65) Prior Publication Data
US 2017/0090240 A1    Mar. 30, 2017

(30) Foreign Application Priority Data

Sep. 24, 2015  (CN) .......................... 2015 1 0614389

(51) Int. Cl.
*G02F 1/1333* (2006.01)
*G02F 1/1335* (2006.01)
*G02F 1/1368* (2006.01)

(52) U.S. Cl.
CPC ...... *G02F 1/133382* (2013.01); *G02F 1/1368* (2013.01); *G02F 1/13338* (2013.01); *G02F 1/133514* (2013.01)

(58) Field of Classification Search
CPC ........... G02F 1/133382; G02F 1/13338; G02F 1/1368; G02F 1/133514
See application file for complete search history.

(56) References Cited

U.S. PATENT DOCUMENTS

| | | | | |
|---|---|---|---|---|
| 4,093,355 A * | 6/1978 | Kaplit | ............... | G02F 1/133382 219/209 |
| 4,773,735 A * | 9/1988 | Ukrainsky | ........ | G02F 1/133382 349/161 |
| 5,559,614 A * | 9/1996 | Urbish | .............. | G02F 1/133382 349/21 |
| 6,089,751 A * | 7/2000 | Conover | ........... | G02F 1/133382 219/209 |
| 6,191,839 B1 * | 2/2001 | Briley | ............... | G02F 1/133382 349/161 |
| 2002/0033919 A1 * | 3/2002 | Sanelle | ............... | G02F 1/13338 349/122 |
| 2002/0054261 A1 * | 5/2002 | Sekiguchi | ........... | G02F 1/13338 349/122 |
| 2003/0122799 A1 * | 7/2003 | Yu | ........................... | G06F 3/045 345/173 |
| 2008/0309865 A1 * | 12/2008 | Sugita | ............... | G02F 1/133382 349/150 |
| 2012/0319992 A1 * | 12/2012 | Lee | ......................... | G06F 3/044 345/174 |
| 2014/0078408 A1 * | 3/2014 | Shim | .................... | G02F 1/1313 349/2 |

(Continued)

*Primary Examiner* — James Dudek
(74) *Attorney, Agent, or Firm* — ScienBiziP, P.C.

(57) ABSTRACT

A liquid crystal display (LCD) defines an active area and a surrounding non-display area defined. The LCD includes a first substrate, a second substrate, a liquid crystal layer, and a temperature controller. The second substrate includes a shading unit corresponding to the active area. The liquid crystal layer is between the first substrate and the second substrate. The temperature controller includes a heater configured to provide heat of the LCD to ensure a satisfactory function of the LCD.

12 Claims, 12 Drawing Sheets

(56) References Cited

U.S. PATENT DOCUMENTS

| | | | |
|---|---|---|---|
| 2014/0152933 A1* | 6/2014 | Anupongongarch | G02F 1/133382 349/42 |
| 2015/0138462 A1* | 5/2015 | Yang ........................ | G02F 1/132 349/21 |
| 2015/0370119 A1* | 12/2015 | Liu ................... | G02F 1/133382 349/106 |

* cited by examiner

US 9,964,792 B2

LIQUID CRYSTAL DISPLAY

CROSS-REFERENCE TO RELATED APPLICATIONS

This application claims priority to China Patent Application No. 201510614389.3 filed on Sep. 24, 2015, the contents of which are incorporated by reference herein.

FIELD

The subject matter herein generally relates to liquid crystal displays.

BACKGROUND

Liquid crystal displays (LCDs) have widespread usage. LCDs have been employed in applications subject to significant temperature variations. A LCDs performance is temperature-dependant, and in particular, performs poorly at low temperatures.

BRIEF DESCRIPTION OF THE DRAWINGS

Implementations of the present technology will now be described, by way of example only, with reference to the attached figures.

DETAILED DESCRIPTION

Figure 1:
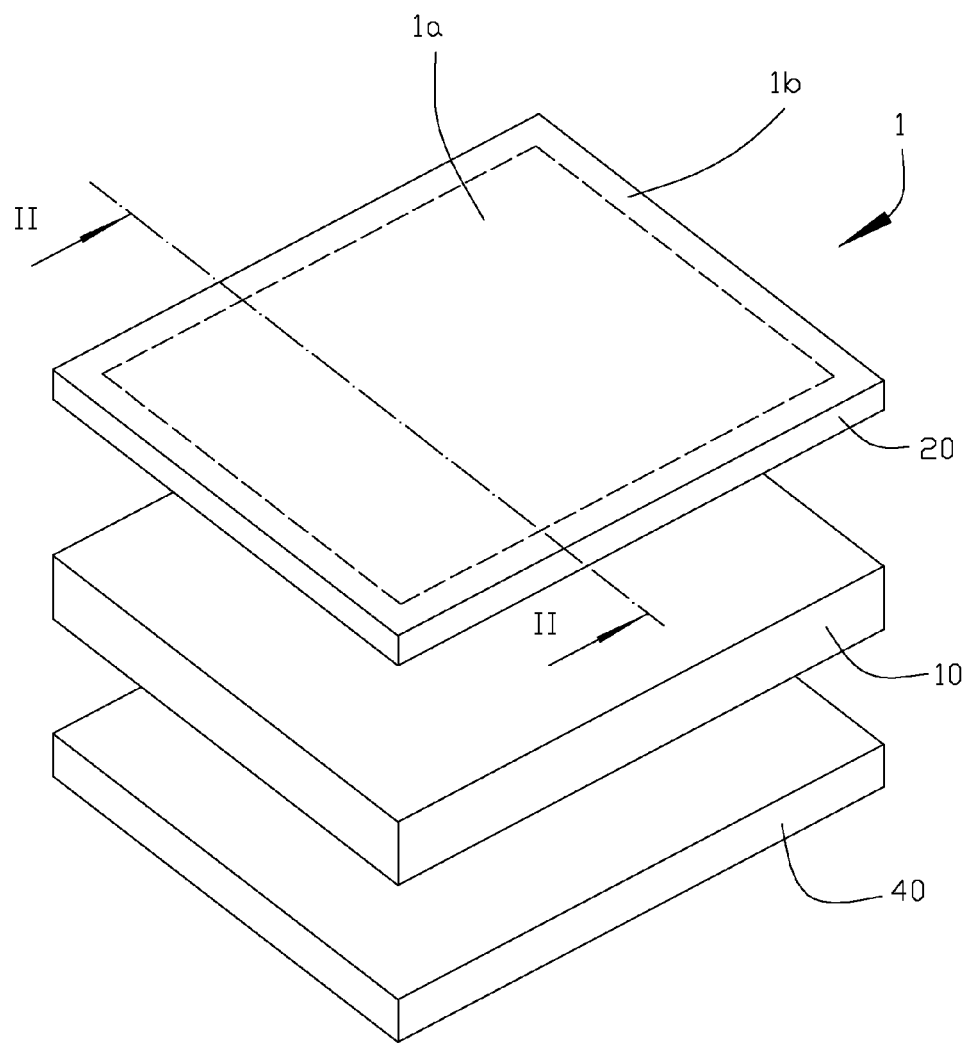
FIG. 1 is an isometric view of a liquid crystal display.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like The present disclosure is described in relation to a liquid crystal display (LCD) 1.

FIG. 1 illustrates a first embodiment of the LCD 1. An active area 1a and a surrounding non-display area 1b are defined on the LCD 1.

Figure 2:
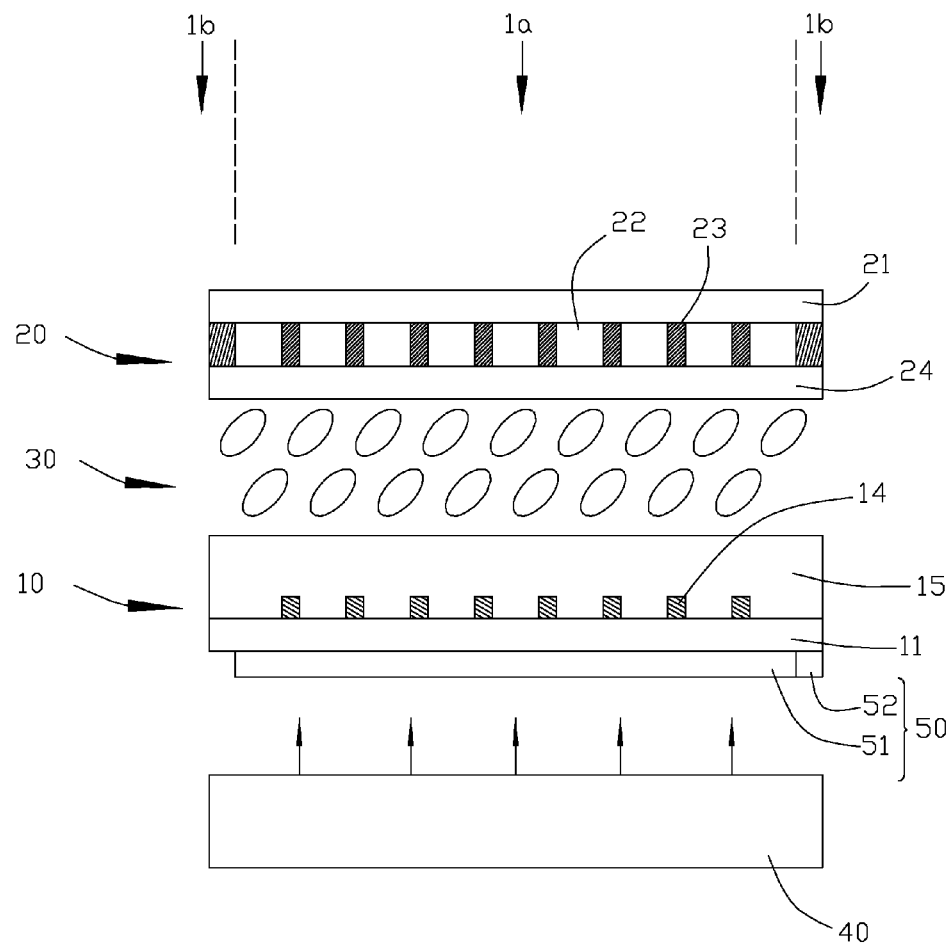
FIG. 2 is a cross sectional view of the liquid crystal display of a first embodiment of FIG. 1 taken along line II-II of FIG. 1, the liquid crystal display comprises a first substrate, a second substrate, and a heater.

FIG. 2 illustrates a cross sectional view of the LCD 1 taken along line II-II of FIG. 1. The LCD 1 can comprise a first substrate 10, a second substrate 20, a liquid crystal layer 30 between the first substrate 10 and the second substrate 20, and a backlight unit 40. The backlight unit 40 is configured to supply lights to the first substrate 10, the second substrate 20, and the liquid crystal layer 30. In at least one embodiment, the first substrate 10 is a thin film transistor (TFT) array substrate, and the second substrate 20 is a color filter (CF) substrate. In other embodiments, the first substrate 10 is an integration substrate of TFT array and CF, and the second substrate 20 is a common-electrode substrate.

Figure 3:
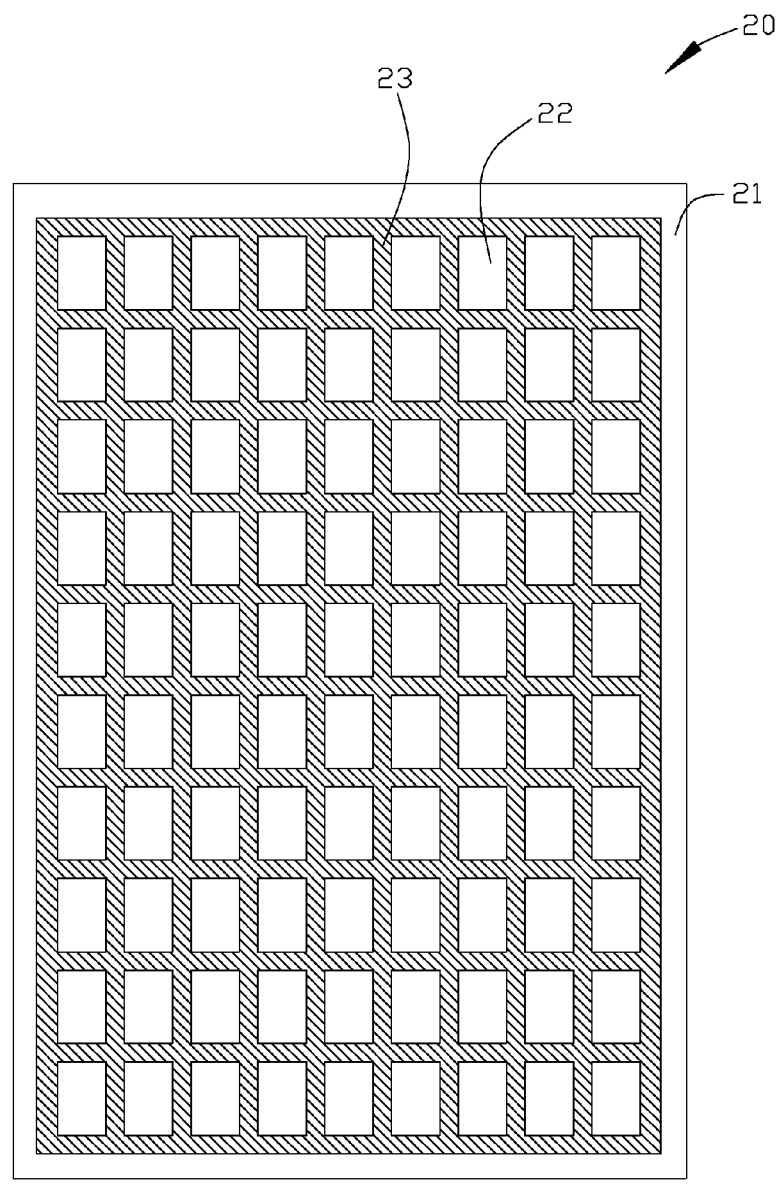
FIG. 3 is a top view of the second substrate of the liquid crystal display of FIG. 2.

FIG. 3 illustrates a top view of the second substrate 20 of the LCD 1. The filter units 22 are arranged in a matrix, and the black matrix 23 is located among the filter units 22.

Figure 4:
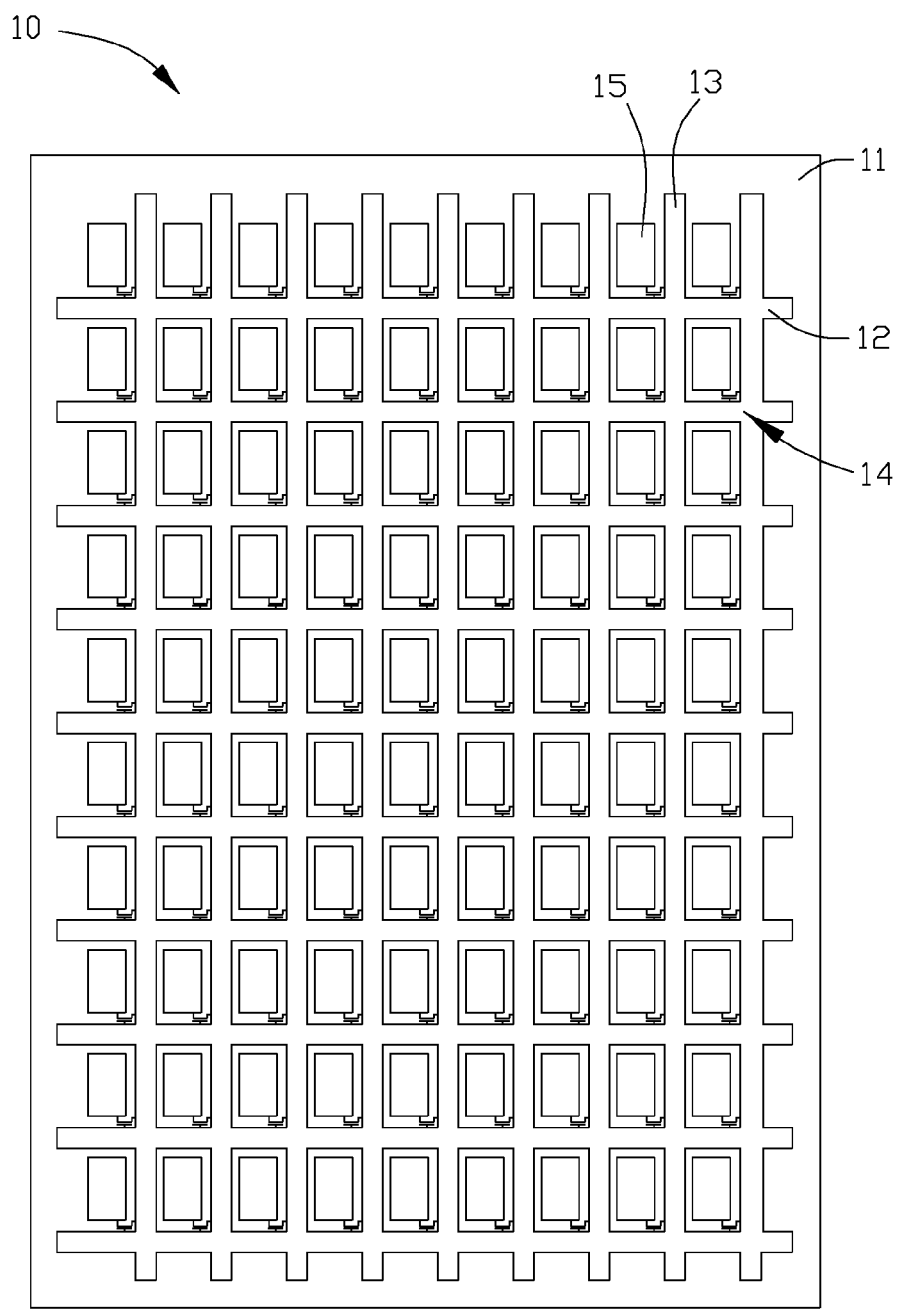
FIG. 4 is a top view of the first substrate of the liquid crystal display of FIG. 2.

FIG. 4 illustrates a top view of the first substrate 10 of the LCD 1. The first substrate 10 can comprise a first base 11, a plurality of scan lines 12, a plurality of data lines 13, and a plurality of pixel electrodes 15, which are formed on the first base 11. A plurality of TFTs 14 is disposed at intersections of the scan lines 12 and the data lines 13. The pixel electrodes 15 are surrounded by the scan lines 12 and the data lines 13, and are coupled to the TFTs 14 respectively. Location of the scan lines 12 and data lines 13 are overlapping on the black matrix 23.

The second substrate 20 can comprise a second base 21, a plurality of filter units 22 formed on the second base 21, a shading unit 23 located between any pair of filter units 22, and a common electrode layer 24 covering the filter units 22 and the shading unit 23. In at least one embodiment, the shading unit 23 is a black matrix. The filter unit 22 can comprise a red filter unit, a green filter unit, and a blue filter unit. In other embodiments, the filter unit 22 can comprise other color filter units.

The LCD 1 can further comprise a temperature controller 50. In at least one embodiment, the temperature controller 50 is positioned on one surface of the first base 11 away from the liquid crystal layer 30. In at least one embodiment, the temperature controller 50 can comprise a heater 51 and a controller 52, which is substantially coplanar with the heater 51. The heater 51 is located on one surface of the first base 11 corresponding to the active area 1a. The controller 52 is located on the surface of the first base 11 corresponding to the non-display area 1b. The controller 52 is coupled to the heater 51. The heater 51 is configured to provide heat of the LCD 1 to ensure a satisfactory functionality of the LCD 1. The controller 52 is configured to sense working environment temperature of the LCD 1 and control the heater 51 operation when the working environment temperature of the LCD 1 is lower than a preset temperature, such as 25 degrees centigrade. In other embodiments, the preset temperature can be adjusted according to needs.

The heater 51 can include a metal wire, and provides heat when a current is passed through. The heating effect of the heater 51 is related to a length of the metal wire, and when the length of the metal wire of the heater 51 is longer, a resistance of the heater 51 is larger, which causes the heating effect of the heater 51 to be improved. In the at least one embodiment, the heater 51 can be made of pure metal, metallic compound or metal alloy consist of one or more conductive and exothermic material, such as copper, silver, tin, or tungsten.

Figure 5:
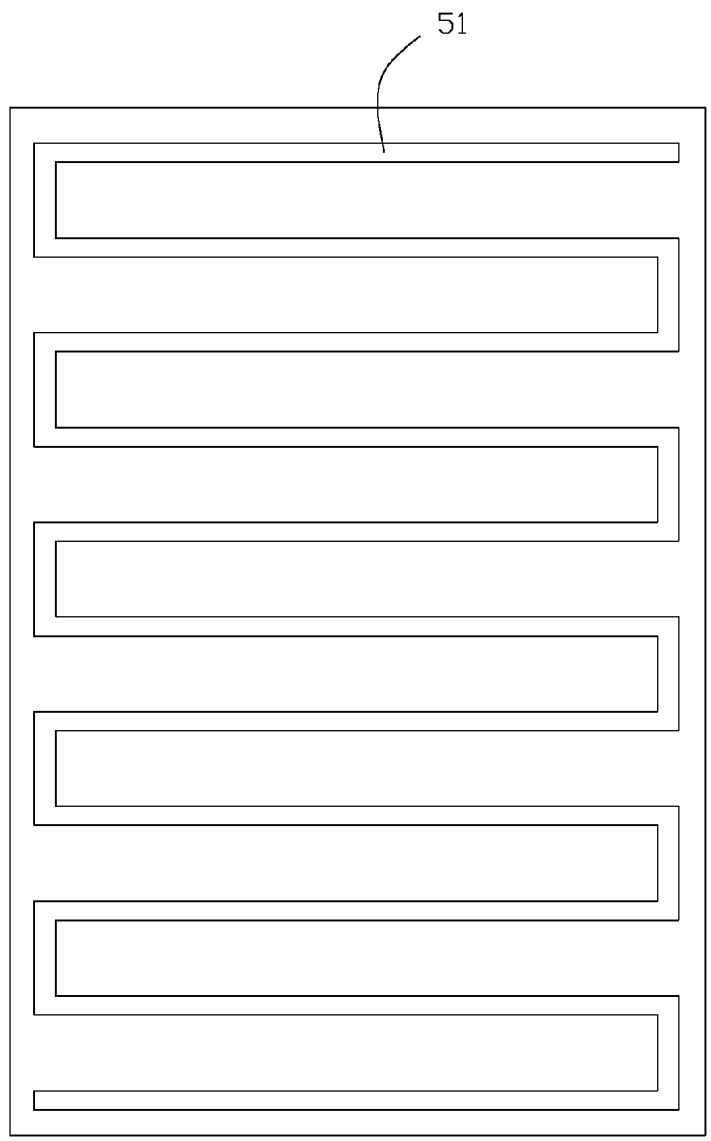
FIG. 5 is a top view of a first embodiment of the heater of the liquid crystal display of FIG. 2.

FIG. 5 illustrates a top view of a first embodiment of the heater 51. The heater 51 is substantially a square wave shaped. The heater 51 corresponds to the black matrix 23, thus an aperture ratio of the LCD 1 cannot be affected. The length of the heater 51 is longer and the heating effect is better.

Figure 6:
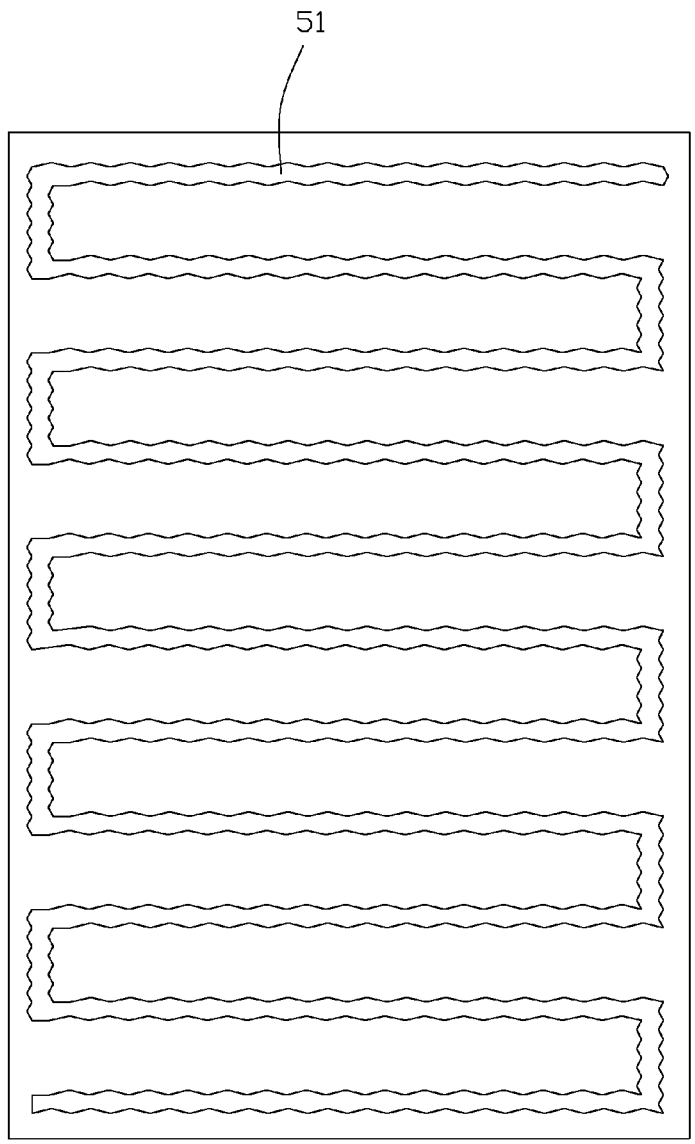
FIG. 6 is a top view of a second embodiment of the heater of the liquid crystal display of FIG. 2.

FIG. 6 illustrates a top view of a second embodiment of the heater 51. The heater 51 is substantially a square wave shaped with wave edges. The heater 51 corresponds to the black matrix 23, thus the aperture ratio of the LCD 1 cannot be affected. The length of the heater 51 is longer and the heating effect is better.

Figure 7:
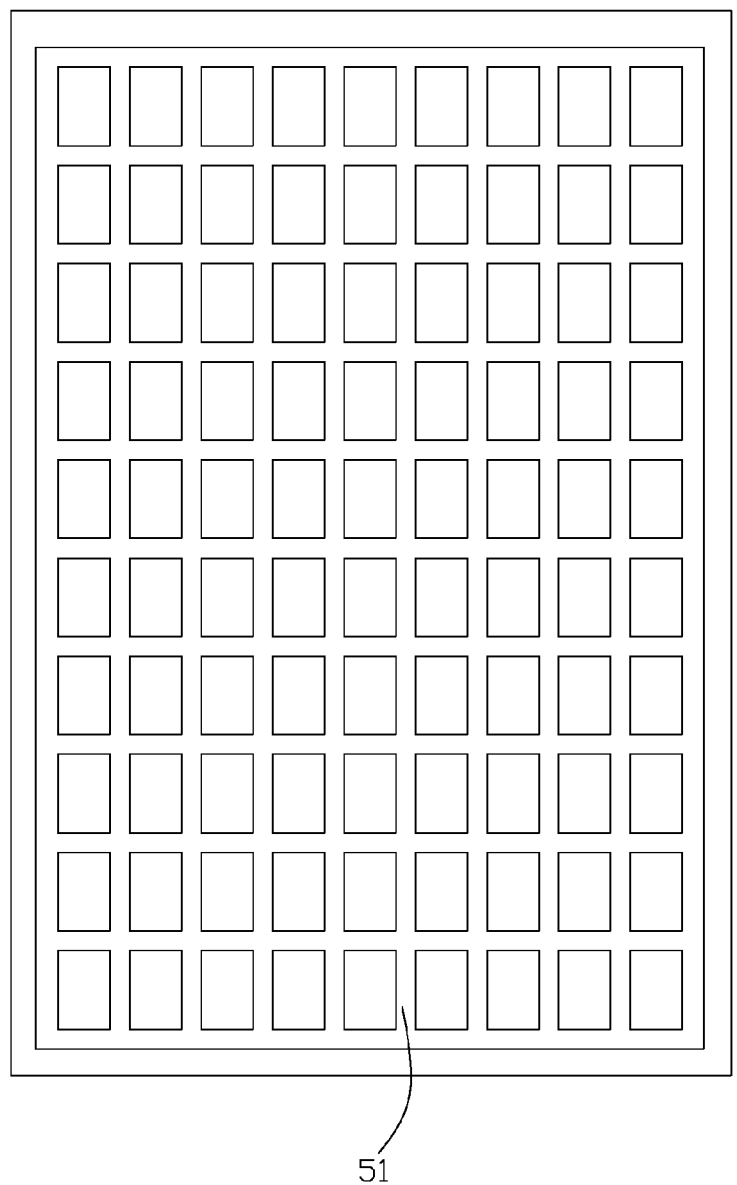
FIG. 7 is a top view of a third embodiment of the heater of the liquid crystal display of FIG. 2.

FIG. 7 illustrates a top view of a third embodiment of the heater 51. The heater 51 is substantially a metal mesh. The heater 51 corresponds to the black matrix 23, thus the aperture ratio of the LCD 1 cannot be affected. The length of the heater 51 is longer and the heating effect is better.

Figure 8:
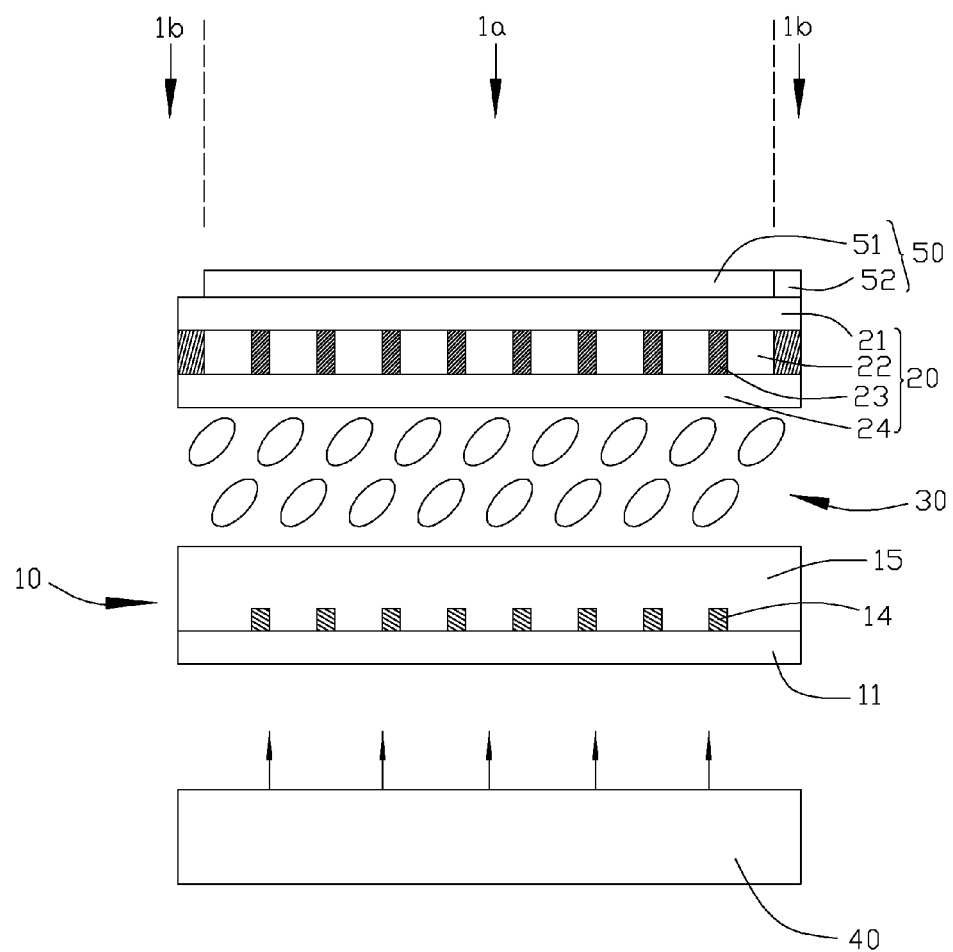
FIG. 8 is a cross sectional view of the liquid crystal display of a second embodiment of FIG. 1 taken along line II-II of FIG. 1.

FIG. 8 illustrates a cross sectional view of a second embodiment of the LCD 1. In the first embodiment, the temperature controller 50 is positioned on one surface of the first base 11 away from the liquid crystal layer 30. In the second embodiment, the temperature controller 50 is positioned on one surface of the second base 21 away from the liquid crystal layer 30. The heater 51 is located on the surface of the second base 21 corresponding to the active area 1a, and the controller 52 is located on the surface of the second base 21 corresponding to the non-display area 1b. The heater 51 can include the metal wire substantially formed in a square wave shaped, a square wave shaped with wave edges, or a metal mesh as in first embodiment.

Figure 9:
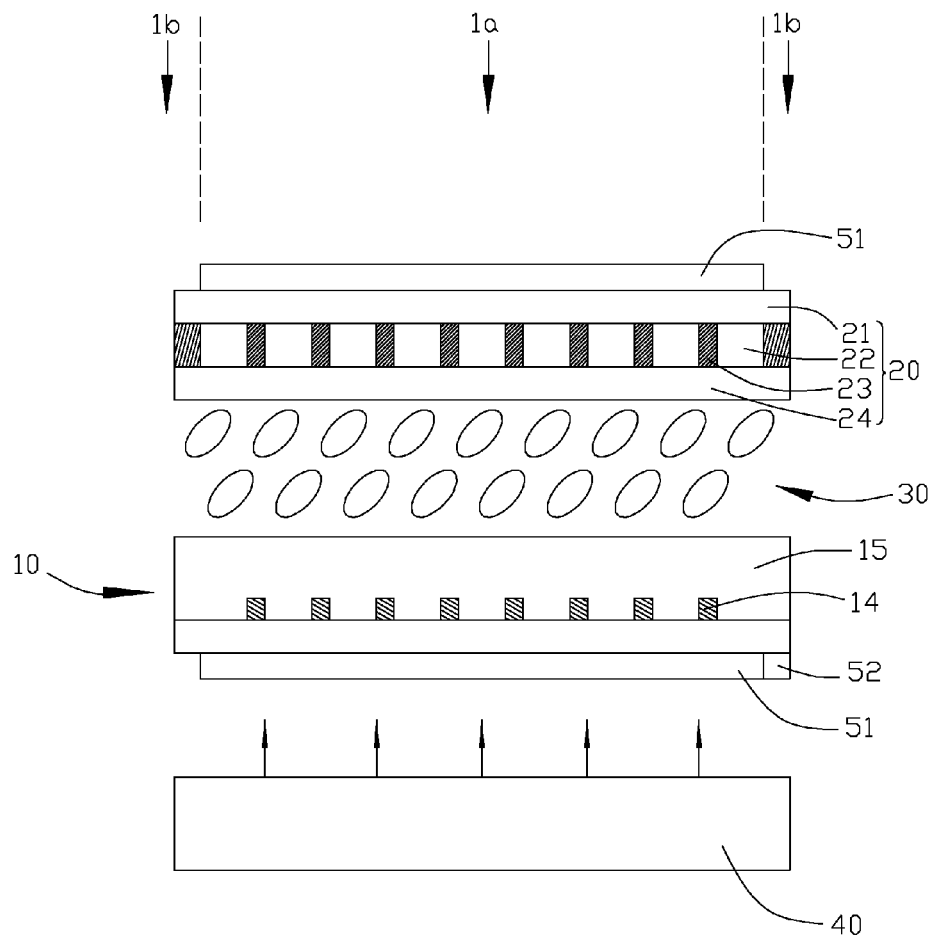
FIG. 9 is a cross sectional view of the liquid crystal display of a third embodiment of FIG. 1 taken along line II-II of FIG. 1.

FIG. 9 illustrates a cross sectional view of a third embodiment of the LCD 1. In the first embodiment, the temperature controller 50 is positioned on one surface of the first base 11 away from the liquid crystal layer 30. In the third embodiment, the temperature controller 50 is positioned on one surface of the first base 11 away from the liquid crystal layer 30 and one surface of the second base 21 away from the liquid crystal layer 30. The controller 52 is located on the surface of the first base 11 corresponding to the non-display area 1b. In other embodiments, the controller 52 is located on the surface of the second base 21 corresponding to the non-display area 1b. The temperature controller 50 can comprise two heaters 51. One heater 51 is located on the surface of the first base 11 corresponding to the active area 1a and another heater 51 is located on the surface of the second base 21 corresponding to the active area 1a. The controller 52 is coupled to the heaters 51. Each heater 51 can include the metal wire substantially formed in a square wave shaped, a square wave shaped with wave edges, or a metal mesh as in first embodiment.

Figure 10:
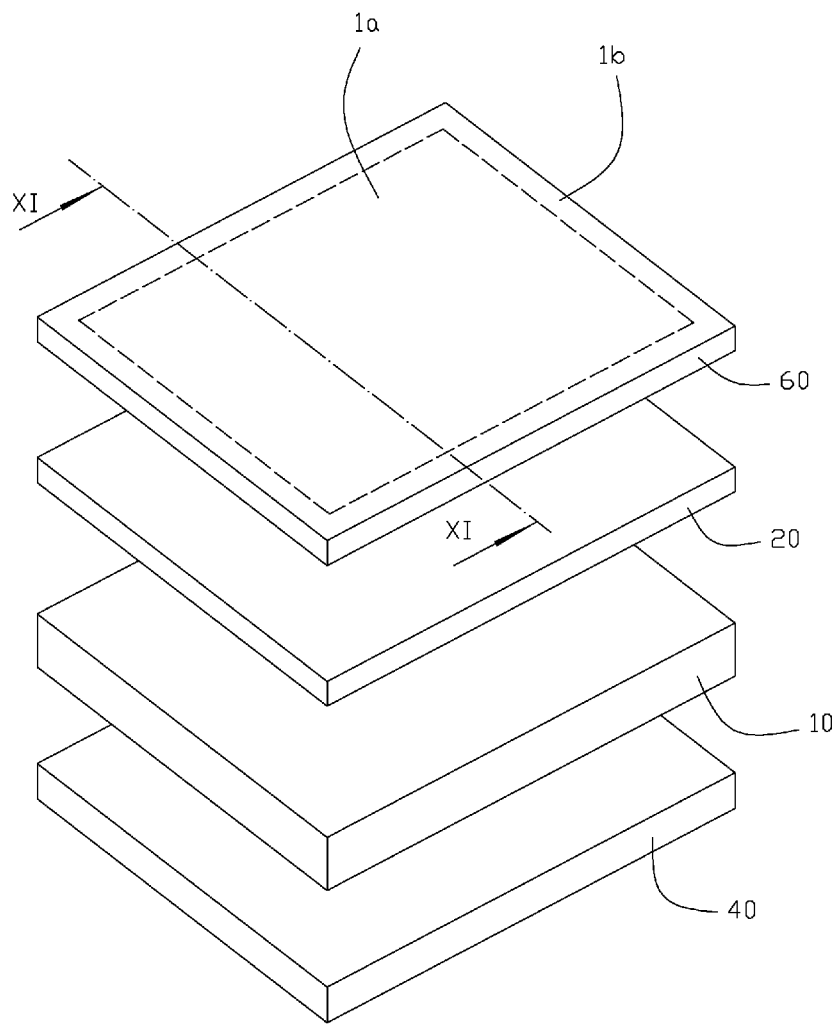
FIG. 10 is an isometric view of a fourth embodiment of a liquid crystal display.
Figure 11:
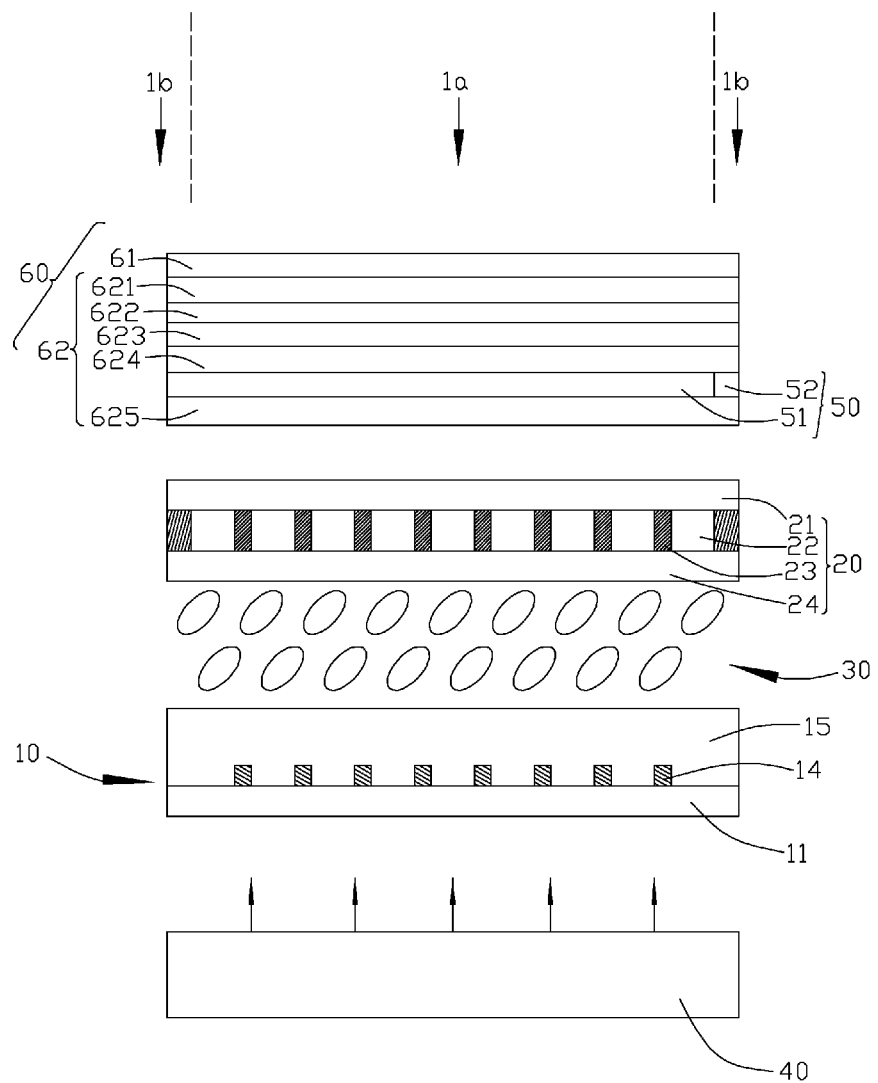
FIG. 11 is a cross sectional view of the liquid crystal display of the fourth embodiment of FIG. 10 taken along line XI-XI of FIG. 10.

FIG. 10 and FIG. 11 illustrate a fourth embodiment of the LCD 1. Different from the first embodiment, the LCD 1 future comprises a touch panel 60, and the heater 51 is positioned in the touch panel 60 in the fourth embodiment. The touch panel 60 is positioned on one surface of the second base 21 away from the liquid crystal layer 30. The touch panel 60 can comprise a cover glass 61 and a touch construction 62. In at least one embodiment, the touch construction 62 is a double layer construction and can comprise a first patterned electrode layer 621, a first substrate 622, a second patterned electrode layer 623, an insulation layer 624, the heater 51, and a second substrate 625 in that order. The first patterned electrode layer 621 cooperates with the second patterned electrode layer 623 for sensing touch action. The heater 51 can include the metal wire substantially formed in a square wave shaped, a square wave shaped with wave edges, or a metal mesh as in the first embodiment. In at least one embodiment, the controller 52 and the heater 51 are formed on the second substrate 625. In other embodiments, the controller 52 is positioned on one surface of the second base 21 away from the liquid crystal layer 30. The heater 51 can include the metal wire substantially formed in a square wave shaped, a square wave shaped with wave edges, or a metal mesh as in the first embodiment. The heater 51 corresponds to the black matrix 23, thus the aperture ratio of the LCD 1 cannot be affected. The length of the heater 51 is longer and the heating effect is better.

Figure 12:
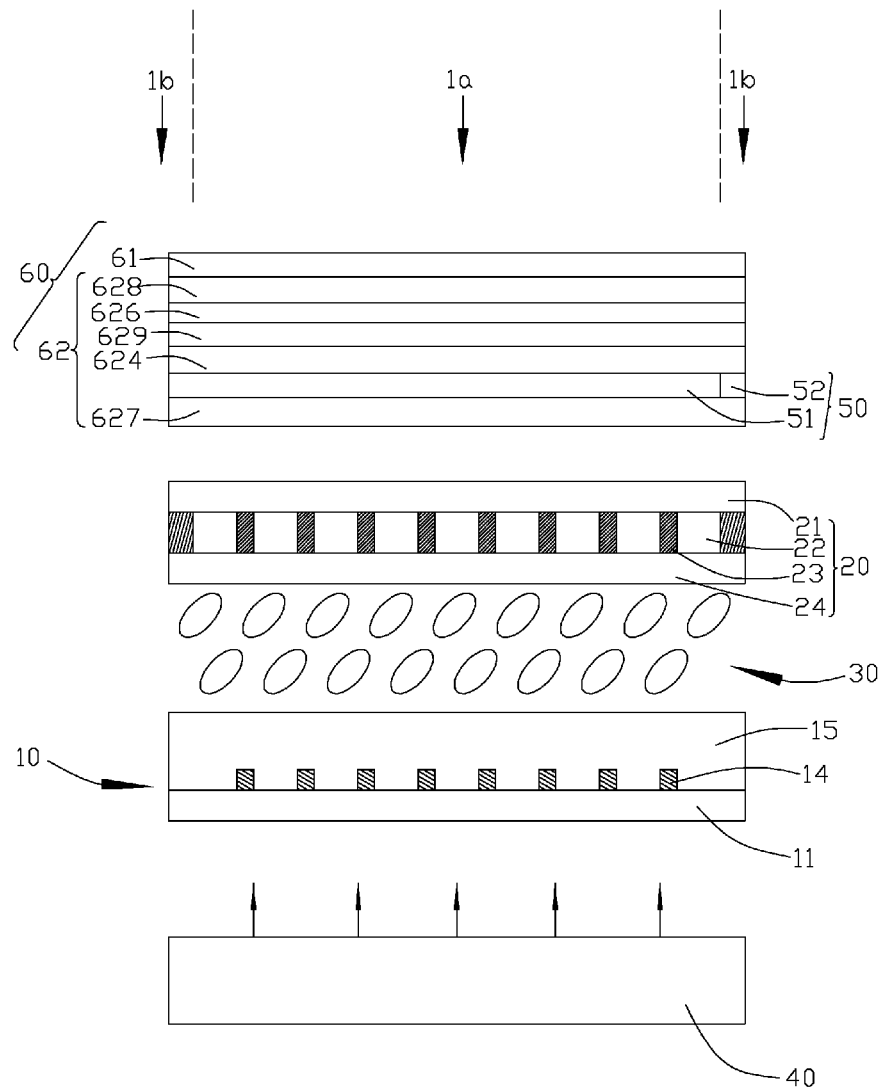
FIG. 12 is a cross sectional view of the liquid crystal display of a fifth embodiment of FIG. 10 taken along line XI-XI of FIG. 10.

FIG. 12 illustrates a fifth embodiment of the LCD 1. In the fifth embodiment, the touch construction 62 of the touch panel 60 is a single layer construction not the double layer construction. The touch construction 62, in the fifth embodiment, can comprise a first electrode layer 628, an electrode insulation layer 626, a second electrode layer 629, a heater insulation layer 624, the heater 51, and a substrate 627 in that order. The first electrode layer 628, a second electrode layer 629, and the heater 51 are positioned between the cover glass 61 and the substrate 627. The first electrode layer 628 is configured to sense a touch action. For example, four angles of the first electrode layer 628 are discharged to form a uniform electric field, when a conductor, such as a finger is placed on the cover glass 61, the touch panel 60 pinpoints the location of the finger according to a proportion of current absorbed. The second electrode layer 629 is a shield to ensure the touch panel 60 does not interfere. The electrode insulation layer 626 is configured to isolate the first electrode layer 628 from the second electrode layer 629. The heater 51 can include the metal wire substantially formed in a square wave shaped, a square wave shaped with wave edges, or a metal mesh as in first embodiment. In at least one embodiment, the controller 52 and the heater 51 are formed on the substrate 627. In other embodiments, the controller 52 is positioned on one surface of the first base 11 away from the liquid crystal layer 30. The heater 51 can include the metal wire substantially formed in a square wave shaped, a square wave shaped with wave edges, or a metal mesh as in first embodiment. The heater 51 corresponds to the black matrix 23, thus the aperture ratio of the LCD 1 cannot be affected. The length of the heater 51 is longer and the heating effect is better.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A liquid crystal display (LCD), an active area and a surrounding non-display area defined on the LCD, the LCD comprising:
    a first substrate;
    a second substrate comprising a shading unit corresponding to the active area;
    a liquid crystal layer between the first substrate and the second substrate; and
    a temperature controller comprising a heater configured to provide heat to the LCD to ensure a satisfactory functionality of the LCD, the heater corresponding to the shading unit;
    wherein the LCD further comprises a touch panel, the touch panel is positioned on one surface of the second substrate away from the liquid crystal layer; the touch panel comprises a third substrate, a fourth substrate opposite to the third substrate, a first patterned electrode layer, an insulation layer, and a second patterned electrode layer; the first patterned electrode layer and the second patterned electrode layer cooperate with each other to sense a touch action applied on the LCD; the heater and the second patterned electrode layer are symmetrically located on opposite surfaces of the insulation layer, and the heater is located on a surface of the fourth substrate away from the liquid crystal layer.

2. The LCD according to claim 1, wherein the heater comprises a metal wire substantially having a square wave shaped.

3. The LCD according to claim 1, wherein the heater comprises a metal wire substantially having a square wave shaped with wave edges.

4. The LCD according to claim 1, wherein the heater comprises a metal wire substantially having a metal mesh.

5. The LCD according to claim 1, wherein the temperature controller further comprises a controller coupled to the heater, the controller is configured to sense working environment temperature of the LCD and control the heater operating when the working environment temperature of the LCD is lower than a preset temperature.

6. The LCD according to claim 5, wherein the controller position corresponds to the non-display area.

7. The LCD according to claim 1, wherein the first substrate is a thin film transistor (TFT) array substrate.

8. The LCD according to claim 1, wherein the second substrate is a color filter (CF) substrate, and the shading unit is a black matrix of the CF substrate.

9. A liquid crystal display (LCD), an active area and a surrounding non-display area defined on the LCD, the LCD comprising:
    a first substrate;
    a second substrate comprising a shading unit corresponding to the active area;
    a liquid crystal layer between the first substrate and the second substrate; and
    a touch panel positioned on one surface of the second substrate away from the liquid crystal layer, the touch panel comprising a heater configured to provide heat to the LCD to ensure a satisfactory functionality of the LCD, the heater corresponding to the shading unit;
    wherein touch panel comprises the touch panel comprises a third substrate, a fourth substrate opposite to the third substrate, a first electrode layer, a second electrode layer, and a heater insulation layer; the first electrode layer senses a touch action applied on the LCD; the second electrode layer serves as a shield; the heater and the second electrode layer are symmetrically located on opposite surfaces of the heater insulation layer, and the heater is located on a surface of the heater insulation layer away from the fourth substrate.

10. The LCD according to claim 9, wherein the heater comprises a metal wire substantially having a square wave shaped.

11. The LCD according to claim 9, wherein the heater comprises a metal wire substantially having a square wave shaped with wave edges.

12. The LCD according to claim 9, wherein the heater comprises a metal wire substantially having a metal mesh.

* * * * *